(12) United States Patent
Djuricic et al.

(10) Patent No.: US 11,198,647 B2
(45) Date of Patent: Dec. 14, 2021

(54) BATCH FOR PRODUCTION OF A REFRACTORY PRODUCT, A PROCESS FOR THE PRODUCTION OF A REFRACTORY PRODUCT, A REFRACTORY PRODUCT AS WELL AS THE USE OF A REFRACTORY PRODUCT

(71) Applicant: Refractory Intellectual Property GmbH & Co. KG, Vienna (AT)

(72) Inventors: Boro Djuricic, Leoben (AT); Norbert Freiberger, Graz (AT); Jurgen Muhlhausser, Leoben (AT); Christoph Bauer, Graz (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 0 days.

(21) Appl. No.: 16/357,177

(22) Filed: Mar. 18, 2019

(65) Prior Publication Data
US 2019/0210925 A1      Jul. 11, 2019

Related U.S. Application Data

(62) Division of application No. 15/543,178, filed as application No. PCT/EP2015/077602 on Nov. 25, 2015, now abandoned.

(30) Foreign Application Priority Data

Feb. 9, 2015    (EP) .................................. 15154358

(51) Int. Cl.
C04B 35/107      (2006.01)
C04B 35/109      (2006.01)
(Continued)

(52) U.S. Cl.
CPC .......... *C04B 35/109* (2013.01); *C04B 35/107* (2013.01); *C04B 35/653* (2013.01);
(Continued)

(58) Field of Classification Search
CPC ............................. C04B 35/107; C04B 35/109
See application file for complete search history.

(56) References Cited

U.S. PATENT DOCUMENTS 4,210,454 A    7/1980   Rechter
4,775,504 A    10/1988  Hiroshi et al.
(Continued)

FOREIGN PATENT DOCUMENTS

CA    1129441 A1   8/1982
CN    1884203 A    12/2006
(Continued)

OTHER PUBLICATIONS

Popov, "Rational Use of Refractories and Optimum Designs of Regnerator in Glass Melting Furnaces", Glass and Ceramics, vol. 59, Nos. 9-10 (Year: 2002).*
(Continued)

*Primary Examiner* — Karl E Group
(74) *Attorney, Agent, or Firm* — Medley, Behrens & Lewis, LLC (57) ABSTRACT

The invention concerns a batch for the production of a refractory product, a process for the production of a refractory product, a refractory product as well as the use of a refractory product.

11 Claims, 3 Drawing Sheets

(51) Int. Cl.
*C04B 38/00* (2006.01)
*C04B 35/653* (2006.01)
*C04B 111/28* (2006.01)

(52) U.S. Cl.
CPC ....... *C04B 38/0058* (2013.01); *C04B 2111/28* (2013.01); *C04B 2235/3201* (2013.01); *C04B 2235/3217* (2013.01); *C04B 2235/3248* (2013.01); *C04B 2235/3272* (2013.01); *C04B 2235/349* (2013.01); *C04B 2235/3418* (2013.01); *C04B 2235/3463* (2013.01); *C04B 2235/3817* (2013.01); *C04B 2235/3826* (2013.01); *C04B 2235/3869* (2013.01); *C04B 2235/3873* (2013.01); *C04B 2235/425* (2013.01); *C04B 2235/5427* (2013.01); *C04B 2235/5436* (2013.01); *C04B 2235/721* (2013.01); *C04B 2235/725* (2013.01); *C04B 2235/77* (2013.01); *C04B 2235/80* (2013.01); *C04B 2235/9669* (2013.01)

(56) References Cited

U.S. PATENT DOCUMENTS

| | | | |
|---|---|---|---|
| 5,214,010 A | 5/1993 | Whittemore | |
| 8,465,720 B2* | 6/2013 | Akamine | C04B 35/62635 |
| | | | 423/415.1 |
| 8,728,966 B2* | 5/2014 | Akamine | C04B 35/117 |
| | | | 501/87 |
| 9,815,741 B2* | 11/2017 | Akamine | C04B 35/101 |
| 2007/0270303 A1* | 11/2007 | Boussant-Roux | C04B 35/109 |
| | | | 501/105 |
| 2015/0158770 A1* | 6/2015 | Gupta | C03B 5/43 |
| | | | 65/374.13 |
| 2018/0282224 A1 | 10/2018 | Djuricic et al. | |

FOREIGN PATENT DOCUMENTS

| | | | |
|---|---|---|---|
| CN | 101774820 A | | 7/2010 |
| CN | 102211937 A | | 10/2011 |
| CN | 102603334 A | | 7/2012 |
| CN | 105837233 A | | 8/2016 |
| DE | 3408952 A1 | | 12/1985 |
| EP | 0323010 A2 | | 7/1989 |
| EP | 2221286 A1 | | 8/2010 |
| JP | H02285014 A | | 11/1990 |
| JP | 2003040684 A | * | 2/2003 |
| JP | 56045864 | | 12/2014 |
| JP | 58013465 | | 11/2015 |
| RU | 2039025 A | * | 7/1995 |
| RU | 2267469 A | | 10/2005 |
| SU | 567709 A | * | 8/1977 |
| SU | 1470730 A | * | 4/1989 |

OTHER PUBLICATIONS

"Preliminary Amendment for U.S. Appl. No. 15/543,178", Filed Date: Jul. 12, 2017, 5 pages.
"Restriction Requirement for U.S. Appl. No. 15/543,178", dated Sep. 25, 2018, 8 pages.
"Response to the Restriction Requirement for U.S. Appl. No. 15/543,178", Filed Date: Nov. 19, 2018, 3 pages.
"Non-Final Office Action for U.S. Appl. No. 15/543,178", dated Dec. 17, 2018, 7 pages.

* cited by examiner

BATCH FOR PRODUCTION OF A REFRACTORY PRODUCT, A PROCESS FOR THE PRODUCTION OF A REFRACTORY PRODUCT, A REFRACTORY PRODUCT AS WELL AS THE USE OF A REFRACTORY PRODUCT

RELATED APPLICATIONS

This application is a divisional of (abandoned) U.S. patent application Ser. No. 15/543,178, filed on Jul. 12, 2017, which is a national stage entry under 35 U.S.C. § 371 of PCT/EP2015/077602, filed on Nov. 25, 2015, which claims priority to European Patent Application No. EP15154358.4, filed on Feb. 9, 2015. The entireties of these application are incorporated herein by reference.

DESCRIPTION

The invention relates to a batch for the production of a refractory product, to a process for the production of a refractory product, to a refractory product as well as to the use of a refractory product.

The term "refractory product" as used in the context of the invention in particular describes refractory ceramic products with a service temperature of more than 600° C., and preferably refractory substances in accordance with DIN 51060, i.e. substances with a pyrometric cone equivalent of >SK17. The pyrometric cone equivalent may in particular be determined in accordance with DIN EN 993-12.

In known manner, the term "batch" describes a composition formed from one or more components from which a refractory product can be produced by means of a heat treatment, i.e. in particular by means of ceramic firing or by melting.

Conventional refractory substances for the production of a refractory product are in particular based on the metallic oxides $Al_2O_3$, $MgO$, $SiO_2$, $CaO$, $Cr_2O_3$ and $ZrO_2$. In order to produce conventional refractory ceramic substances, batches formed from components or raw materials are prepared which in particular comprise substances consisting of these oxides. In principle, it is possible to produce refractory ceramic substances with outstanding refractory properties based on these oxides.

Recent developments have tended towards extending the applications of refractory products into fields in which conventional refractory products would not be able to be used because of their refractory properties. In this respect, conventional refractory products based on metallic oxides suffer from limitations, in particular as regards their tolerance to damage and their corrosion resistance. Extending these boundaries of application is possible, however, if refractory substances also comprise raw materials based on non-oxides in addition to raw materials based on the metal oxides mentioned above. Particular types of non-oxide raw materials of this type may be non-oxide raw materials in the form of metal carbides, metal nitrides, metal borides, metal oxycarbides, metal oxynitrides and metal oxycarbonitrides. By means of a combination of oxide-based raw materials on the one hand and non-oxide raw materials on the other hand, refractory substances can be produced with properties which can be used for applications beyond the field of application of conventional refractory ceramic substances based on metallic oxides.

In particular, the service temperatures, the tolerance to damage and the corrosion resistance of refractory ceramic substances based on a combination of raw materials based on oxides and non-oxides can be substantially improved.

Non-oxide-based raw materials are usually synthetic raw materials. As a rule, non-oxide raw materials of this type are based on alumina and carbon. To produce non-oxide raw materials of this type based on alumina and carbon, raw materials based on alumina and carbon are usually melted in an electric arc furnace. The cooled melt is then broken up into pieces and used as raw material for batches for the production of refractory products.

In principle, the production of non-oxide raw materials by electric melting processes has proven itself. However, two particular problems may arise during production if the carbon content in the batch is set too high. Firstly, during production of the raw material, large proportions of the unwanted aluminium carbide phase $Al_4C_3$ may appear. However, this phase is extremely sensitive to hydration, and so a refractory product which includes not insubstantial proportions of this phase is also sensitive to hydration. Secondly, carbon monoxide (CO) might be formed during the melting process; the toxicity of this gas may in particular be dangerous to the personnel in the area around the electric arc furnace.

The object of the invention is to provide a batch by means of which a refractory product, in particular a so-called non-oxide refractory product, can be produced which is characterized by an extremely small proportion of hydration-sensitive phases, in particular a small proportion of hydration-sensitive phases based on alumina-carbon, such as $Al_4C_3$ in particular.

A further object of the invention is to provide a batch for the production of a refractory product, in particular a non-oxide refractory product, melting of which produces an extremely small proportion of carbon monoxide.

A further object of the invention is to provide a process by means of which a refractory product, in particular a non-oxide refractory product, can be produced with an extremely small proportion of hydration-sensitive phases, in particular of hydration-sensitive phases based on alumina-carbon.

A further object of the invention is to provide a process for the production of a refractory product, in particular a non-oxide refractory product, wherein only extremely small proportions of carbon monoxide are produced during the production thereof.

A further object of the invention is to provide a refractory product, in particular a non-oxide refractory product, which comprises an extremely small proportion of hydration-sensitive phases, in particular hydration-sensitive phases based on alumina-carbon.

The object of the invention is achieved by means of the inventive provision of a batch for the production of a refractory product comprising the following components:
a base component based on alumina;
at least one of the following silicate components: at least one silicate component based on aluminium silicate or at least one silicate component based on zirconium silicate;
a carbon component.

Surprisingly, in accordance with the invention, it has been established that through a batch of this type a non-oxide-based refractory product can be produced which comprises only an extremely small proportion of hydration-sensitive phases, in particular of the hydration-sensitive phase in the form of $Al_4C_3$.

Furthermore, it has surprisingly been established that when melting a batch of this type, in particular when melting in an electric arc furnace, only an extremely small proportion of carbon monoxide is generated.

An essential factor in these advantageous properties of the batch of the invention is in particular the at least one silicate component in the form of at least one aluminium silicate or at least one zirconium silicate. The scientific basis for this advantageous effect of these silicates in providing the solution given by the invention has yet to be explained in detail, but there are indications that the presence of silicon suppresses the formation of $Al_4C_3$.

By means of the batch of the invention, a refractory non-oxide product based on alumina-carbon can be produced. The batch therefore has a base component based on alumina ($Al_2O_3$). The base component may consist of one or more components or raw materials based on alumina. The fact that the base component is said to be "based on" alumina means that it comprises one or more components or raw materials which respectively consist of at least 50% by weight of $Al_2O_3$ with respect to the respective components. In this respect, the base component can in particular consist of one or more of the following components: fused corundum, sintered corundum or calcined alumina.

Particularly preferably, the base component is in the form of calcined alumina. Preferably, the base components can be present in the batch in a proportion of at least 50% by weight including, for example, in a proportion of at least 55%, 60%, 65%, 70%, 75%, 80%, 82%, 84%, 86%, 88%, 90%, 91%, 92%, 93%, 94% or 95% by weight. Furthermore, the base component may, for example, be present in the batch in a proportion of at most 99%, 98%, 97%, 96%, 950%, 94%, 93%, 92%, 91% or 90% by weight.

The details given herein as a % by weight are respectively with respect to the total weight of the batch of the invention or the product of the invention, unless otherwise indicated in individual cases.

The at least one silicate component may comprise one or more of the following components or raw materials: at least one silicate component based on aluminium silicate or at least one silicate component based on zirconium silicate. In accordance with a preferred embodiment, the at least one silicate component includes at least one silicate component based on aluminium silicate and at least one silicate component based on zirconium silicate (mineralogical zircon, $ZrSiO_4$).

The term "aluminium silicate" as used here generally represents silicates based on the basic oxides $Al_2O_3$ and $SiO_2$. In this respect, the term "aluminium silicate" encompasses both aluminosilicates and also aluminium silicates. The silicate component based on aluminium silicate can in particular be in the form of one or more of the following components or raw materials based on aluminium silicate: kaolin, metakaolin, fireclay, pyrophyllite, calcined bauxite or mullite. Kaolin is a natural raw material with kaolinite ($Al_4[(OH)_8|Si_4O_{10}]$) as the main ingredient. Pyrophyllite ($Al_2[(OH)_2|Si_4O_{10}]$) is an abundant silicate that can be used per se as a natural raw material. Bauxite is an aluminium ore which in particular comprises various aluminium minerals (in particular gibbsite ($\gamma$-$Al(OH)_3$), boehmite ($\gamma$-$AlO(OH)$), diaspore ($\alpha$-$AlO(OH)$), iron compounds (haematite ($Fe_2O_3$) and goethite ($FeO(OH)$), kaolinite and titanium oxide (anatase ($TiO_2$)). Mullite ($3\,Al_2O_3.2SiO_2$; $2Al_2O_3.SiO_2$) can act as the aluminium silicate in the batch of the invention, in particular as a synthetic mullite, especially in the form of at least one of the following components: fused mullite or sintered mullite.

Silicate components based on aluminium silicate may, for example, be present in the batch in a proportion of at least 0.5% by weight and for example in a proportion of at most 25% by weight including, for example, in a proportion of at least 1%, 2%, 3% or 4% by weight and also, for example, in a proportion of at most 20%, 15%, 12%, 10%, 9%, 8%, 7% or 6% by weight.

Preferably, the silicate component based on aluminium silicate is in the form of at least one of the raw materials fireclay or kaolin or in the form of the raw materials fireclay and kaolin.

Zirconium silicate (i.e. $ZrSiO_4$; mineral name "zircon") may in particular be present as the natural raw material.

Zirconium silicate may, for example, be present in the batch in proportions of at least 1% by weight and also, for example, in proportions of at most 35% by weight including, for example, in a proportion of at least 2%, 3%, 4%, 5%, 6% or 7% by weight and also, for example, in a proportion of at most 30%, 25%, 20%, 15%, 12%, 11%, 10% or 9% by weight.

In total, the silicate components may, for example, be present in the batch in a proportion of at least 0.5% by weight and, for example, in a proportion of at most 35% by weight including, for example, in a proportion of at least 1%, 2%, 3% or 4% by weight and also, for example, in a proportion of at most 30%, 25%, 20%, 15%, 12%, 11%, 10% or 9% by weight.

The carbon component comprises one or more carbon sources, for example at least one of the following carbon sources: graphite, carbon black or petroleum coke. Preferably, the carbon component is present in the form of graphite.

Preferably, the carbon component is present in the batch in a proportion of at least 0.5% by weight, preferably in a proportion of at most 8.5% by weight including, for example, in a proportion of at least 1%, 2%, 3% or 4% by weight and also, for example, in a proportion of at most 8%, 7%, 6% or 5% by weight.

In accordance with the invention, it has surprisingly been established that the proportion of $Al_4C_3$ in a refractory product produced from a batch in accordance with the invention by means of a melting process can be drastically reduced if the proportion of carbon in the batch is adjusted such that the proportion of carbon in the product produced from the batch is less than 2.4% by weight. In accordance with the invention, it has been established that this target can in particular be reached when the proportion of carbon in the batch is in particular less than 8.5% by weight. In this respect, the proportion of carbon in the batch can in particular be less than 8.5% by weight including, for example, less than 8%, 7%, 6% or 5% by weight. Furthermore, for example, the proportion of carbon in the batch may be set at more than 0.45% by weight.

In accordance with the invention, in addition to the base component (in particular in the form of calcined silica), the silicate component (in particular in the form of kaolin, metakaolin, fireclay, pyrophyllite, fired bauxite and/or mullite as well as in the form of zircon) as well as the carbon component (in particular in the form of graphite), the batch may comprise other components, in only a proportion of less than 2% by weight including, for example, in a proportion of less than 1% by weight.

Preferably, all of the components of the batch of the invention are present in grains which are as fine as possible. Preferably, all of the components of the batch have a mean grain size of less than 1 mm. As an example, at least 90% by weight of the components of the batch including, for example, 100% by weight of the components of the batch may have a grain size of less than 1 mm, less than 0.8 mm, less than 0.6 mm or even less than 0.5 mm.

As is the case with most batches for the production of non-oxide ceramic substances, the batch of the invention may also react extremely sensitively to certain components. In this respect, in accordance with the invention, the components of the batch may be fine-tuned so that the amount of certain substances or oxides in the batch does not exceed a specific amount. In particular, the batch may comprise the following oxides in the following proportions, wherein the respective proportions may be present in the batch individually or in any combination:

$Al_2O_3$: at least 60%, 65%, 70%, 73%, 76%, 78%, 80%, 82%, 84%, 85%, 86%, 87%, 88% or 89% by weight, at most 98%, 97%, 96%, 95%, 94%, 93% or 92% by weight;

$SiO_2$: at least 0.5% or 1% or 1.5% or 2% or 2.5% by weight, at most 12%, 11%, 10%, 9%, 8%, 7%, 6%, 5%, 4% or 3% by weight;

$ZrO_2$: at least 0.05% or 0.1% or 0.5% or 1%, 2%, 3% or 4% by weight, at most 25%, 22%, 20%, 18%, 16%, 14%, 12%, 10%, 9%, 8%, 7%, 6% or 5% by weight;

$TiO_2$: less than 2% or 1% or 0.5% by weight;

$Fe_2O_3$: less than 2% or 1% or 0.5% by weight;

$Na_2O+Li_2O+K_2O$: less than 2% or 1% or 0.5% by weight.

In order to produce a refractory product from the batch of the invention, it may undergo a heat treatment, in particular by melting. After cooling a melt formed from such a batch of the invention, a refractory product is obtained.

The invention also pertains to a process for the production of a refractory product, comprising the following steps:
providing a batch in accordance with the invention;
melting the batch;
cooling the melt.

Melting the batch by heat treatment is in particular carried out so that the batch forms a melt. In particular, the batch may be melted in an electric arc furnace. In particular, the batch may be melted at temperatures of over 2000° C.

Preferably, the batch may be melted in a reducing atmosphere. Depending on the parameters selected for the melting procedure and/or the batch components, a reducing atmosphere of this type may be established by the melting per se of the batch of the invention.

After subsequent cooling and solidification of the melt, a refractory product is obtained, in particular in the form of a non-oxide refractory product, for example a refractory product also in the form of a solidified melt.

The invention also pertains to a product which in particular is produced by a process in accordance with the invention, in particular a refractory product in the form of a solidified melt.

As an example, the batch of the invention can be melted in a crucible using an electric arc furnace and then can be cooled and solidified therein, so that a refractory product is obtained in the form of a solidified melt.

A product in accordance with the invention is characterized by characteristic phases and properties.

Thus, in particular, the product of the invention may have a very high density, in particular a density of more than 3.3 g/cm$^3$ including, for example, a density in the range 3.3 to 3.9 g/cm$^3$ including, for example, a density of at least 3.4 or 3.5 or 3.55 or 3.6 g/cm$^3$, and also, for example, a density of at most 3.85 or 3.8 or 3.75 or 3.70 g/cm$^3$. Particularly preferably, the density is approximately 3.62 g/cm$^3$.

The product in accordance with the invention may preferably have a relatively small open porosity, for example an open porosity of less than 8% by volume including, for example, an open porosity in the range 2% to 8% by volume including, for example, an open porosity of at most 7%, 6% or 5% by volume and also, for example, an open porosity of at least 3% or 3.5% or 4% or 4.5% by volume. Particularly preferably, the open porosity is approximately 4.85% by volume.

The details provided herein regarding the density are determined in accordance with British Standard BS 1902-3.16:1990 with a mercury intrusion pressure for the measurements of 0.52 psia (pound-force per square inch).

The details provided herein regarding the open porosity are determined in accordance with British Standard BS 1902-3.16:1990 at a mercury intrusion pressure for the measurements of 0.52 psia and 33000 psia (NB: to determine the open porosity in accordance with British Standard BS 1902-3.16:1990, measurements are required at two different pressures).

Furthermore, the product of the invention may comprise a small proportion of carbon, in particular a proportion of carbon of less than 2.4% by weight including, for example, a proportion of carbon of less than 2.2% or 2.0% or 1.8% or 1.6% or 1.4% or 1.2% or 1.0% by weight or even less than 0.9% by weight. Furthermore, the proportion of carbon in the product of the invention may be at least 0.1% or 0.2% or 0.3% or 0.4% or 0.5% or 0.6% or 0.7% or 0.8% by weight.

The details provided here regarding the proportion of carbon in the product are determined in accordance with DIN EN ISO 21068-2:2008-12.

A particular characteristic of the product of the invention is that it may comprise inclusions of metals and metal alloys. In particular, these metals may be metals in the form of metallic aluminium and silicon, since the element aluminium is present in the base component and the element silicon is present in the silicate component of the batch. The metal alloys may in particular be those which comprise at least one of the metals aluminium and silicon, and possibly one or more other metals which are present as elements in the components of the batch, for example titanium (Ti) or iron (Fe), as they are natural impurities in bauxite. In this respect, characteristic inclusions in the product of the invention may be metallic aluminium and metallic silicon as well as, if appropriate, one or more alloys based on the metals aluminium and silicon as well as at least one of the metals titanium and iron, for example at least one of the following alloys: AlSi, AlSiFe, AlSiTi or AlSiTiFe.

Inclusions of metallic aluminium or silicon or the metal alloys indicated above may, for example, be present in the product of the invention in proportions of up to 2% by weight.

A particular characteristic of these inclusions of metallic aluminium and silicon as well as metal alloys is that they are embedded in the product of the invention, in particular when the product of the invention is in the form of a solidified melt. Particularly when the product of the invention is in the form of a solidified melt, the density of the product of the invention is high and the porosity is low, so that the inclusions of these metals and metal alloys are protected from the surrounding atmosphere. Particularly because of this situation, the product of the invention proves to be a superb raw material for a batch for the production of a carbon-bonded refractory product, in particular for the production of a carbon-bonded product in the form of an alumina-carbon product (in particular a $Al_2O_3$—C brick) or a magnesia-carbon product (in particular a MgO—C brick). This is because the metallic inclusions and metal alloys remain stable even at high application temperatures, since they barely come into contact with the surrounding atmosphere. Only when the refractory product becomes worn or cracked do the metallic inclusions and metal alloys appear on the surface and act as antioxidants. In addition, any cracks can be closed by the metallic inclusions and metal alloys, since when they come into contact with the atmosphere, they oxidize and increase in volume and thus close up the cracks which have formed. The refractory product can thus act in a self-healing manner to wear and damage. In this respect, a batch for the production of a carbon-bonded refractory product of this type does not need any further additions of antioxidant apart from the raw material from the product of the invention.

In addition to the phases mentioned above, the product of the invention may in particular also contain one or more of the following phases: metal carbides, metal oxycarbides, metal oxycarbonitrides, metal oxynitrides or metal nitrides. As an example, these phases may be one or more of the following phases: SiC, $Al_4O_4C$, SiAlON, SiCAlON or Al oxynitride.

In this respect, a product in accordance with the invention may comprise the following phases in the following proportions by weight, respectively individually or in combination:

Corundum ($Al_2O_3$): at least 64%, 68%, 70%, 72%, 74%, 76%, 78%, 80%, 82%, 84%, 86%, 88%, 90%, 91% or 92% by weight, at most 99.5% or 99%, 98%, 97%, 96% or 95% by weight;

Total weight of the phases $Al_4O_4C$, SiC, SiAlON, SiCAlON, Al oxynitride: at least 0.5% or 1% or 1.5% or 2% or 2.5% or 3% or 3.5% by weight, at most 36%, 33%, 35%, 30%, 25%, 20%, 18%, 160%, 14%, 12%, 10%, 9%, 8%, 7%, 6%, 5% or 4% by weight;

Total weight of metallic Al and Si as well as the metal alloys AlSi, AlSiFe, AlSiTi, AlSiTiFe:
at most 2% or 1.5% or 1% by weight; including, for example, at least 0.1% or 0.5% by weight.

$Al_4C_3$: at most 2% or 1.5% or 1% or 0.5% by weight.

The total weight of the phases $Al_4O_4C$, SiC, SiAlON, SiCAlON, Al oxynitride may be determined substantially or mostly by the proportion by weight of $Al_4O_4C$ wherein, for example, the proportion by weight of $Al_4O_4C$ in the total weight of the phases $Al_4O_4C$, SiC, SiAlON, SiCAlON, Al oxynitride may be in the range from 0 to 100% by weight, with respect to the total weight of the phases $Al_4O_4C$, SiC, SiAlON, SiCAlON, Al oxynitride. As will be discussed in more detail below, the proportion of the remaining non-oxide phases, in particular the phases SiC, SiAlON and SiCAlON, in the product may advantageously be such that the proportion by weight of $Al_4O_4C$ in the total weight of the phases $Al_4O_4C$, SiC, SiAlON, SiCAlON, Al oxynitride with respect to the total weight of the phases $Al_4O_4C$, SiC, SiAlON, SiCAlON and Al oxynitride, may also, for example, be at most 90%, 80%, 70%0 or 60% by weight and also, for example, at least 10%, 20%, 30% or 40% by weight. In this respect, for example, in the product of the invention, the total weight of $Al_4O_4C$ may be: at least 0.25% or 0.5% or 1% or 1.5% or 2% or 2.5% or 3% or 3.5% by weight, at most 36%, 33%, 30%, 27%, 25%, 20%, 18%, 16%, 14%, 12%, 10%, 9%, 8%, 7%, 6%, 5% or 4% by weight.

Furthermore, the total weight of SiC, SiAlON and SiCAlON in the product of the invention may be: at least 0.25% or 0.5% or 1% or 1.5% or 2% or 2.5% or 3% or 3.5% by weight, at most 30%, 25%, 20%, 18%, 16%, 14%, 12%, 10%, 9%, 8%, 7%, 6%, 5% or 4% by weight.

In addition to the phases mentioned above, the product of the invention may comprise other phases, in particular in a proportion of at most 2% or 1.5% or 1% by weight.

In accordance with the invention, it has been established that the limits to the proportion of $Al_4O_4C$ in the product of the invention to the proportions mentioned above is associated with substantial advantages for the product. Thus, it has been shown that at sufficiently high temperatures and with a sufficiently high proportion of oxygen, $Al_4O_4C$ can react to form $Al_2O_3$ which, however, takes up approximately 25.9% less volume than $Al_4O_4C$, which could lead to an increase in the porosity of the product. An increase in the porosity may, however, result in a greater infiltration of slag for the product and thus to poorer corrosion resistance of the product. In the context of the invention, it has now been discovered that limiting the proportion of $Al_4O_4C$ in the product to the proportions given above does not result in any substantial deterioration in the corrosion resistance of the product and the aims of the invention defined above can simultaneously be accomplished by the invention.

Furthermore, in accordance with the invention, it has been established that limiting the proportion of $Al_4O_4C$ in the product of the invention results in an essentially uniform distribution of the $Al_4O_4C$ crystals present in the product, in particular in the form of islands through the volume of the product. In other words: the product of the invention is in particular characterized by isotropic $Al_4O_4C$ crystals in particular in the form of islands through the volume of the product. In particular, it has been established that the $Al_4O_4C$ crystals in the product of the invention are primarily in the region of the grain boundaries of the grains of $Al_2O_3$. Experiments have shown that in proportions of $Al_4O_4C$ in the product which are over the proportions given for the invention, the $Al_4O_4C$ crystals are primarily arranged in layers, i.e. particularly anisotropically through the product. This has the disadvantage, however, that a layer of this type formed by $Al_4O_4C$ crystals may come to lie on the exterior of the product and thus could come into contact with oxygen, which is a disadvantage from the point of view of oxidation resistance. Furthermore, substantial thermal stresses may be generated between such layers of $Al_4O_4C$ crystals on the one hand and $Al_2O_3$ on the other hand because of the different thermal expansion coefficients of these substances; when the $Al_4O_4C$ crystals are distributed in an isotropic manner, however, these can be dispersed more readily.

Furthermore, it has been shown that there are substantial advantages associated with the proportions mentioned above of the non-oxide silicon-containing phases SiC, SiAlON and SiCAlON in the product of the invention. Thus, it has been shown that these phases react with oxygen to form $SiO_2$, inter alia, at sufficiently high temperatures and with a sufficiently high proportion of oxygen. The presence of a certain proportion of $SiO_2$ in the product may, however, once again lead to the formation of low melting point phases which could lead to an increase in the porosity. At the same time, the hot strength properties of the product could deteriorate. In accordance with the invention, it has now been established that limiting the proportions of SiC, SiAlON and SiCAlON in the product in the proportions given above does not result in any substantial deterioration in the hot strength properties of the product, but the corrosion resistance of the product may be substantially improved.

The crystals of the phases $Al_2O_3$, $Al_4O_4C$, SiC and SiCAlON in the product of the invention may in particular have the following mean dimensions, wherein at least 90% by weight of the respective crystals including, for example, at least 95% or 100% by weight with respect to the proportion of the respective crystals of the phases mentioned above with respect to the total weight of this phase in the product may be in these ranges:

$Al_2O_3$: less than 500 µm including, for example, less than 400, 300 or less than 200 µm;

$Al_4O_4C$: less than 100 µm including, for example, less than 80, 60, 40 or less than 20 µm;

SiC: less than 20 µm including, for example, less than 15, 10 or less than 5 µm;

SiCAlON: less than 20 µm including, for example, less than 15, 10 or less than 5 µm.

Calculated in the respective oxide form, the product may comprise the following oxides in the following respective proportions by weight, wherein the oxides, respectively individually or in combination, may be present in the following respective proportions by weight in the product:

$Al_2O_3$: at least 64%, 68%, 70%, 72%, 74%, 76%, 78%, 80%, 82%, 84%, 86%, 88%, 90%, 91% or 92% by weight, at most 99.5% or 99%, 98%, 97%, 96% or 95% by weight;

$SiO_2$: at least 0.5% or 1% or 1.5% or 2% or 2.5% by weight, at most 15%, 14%, 13%, 12%, 11%, 10%, 9%, 8%, 7%, 6%, 5%, 4% or 3% by weight;

$ZrO_2$: at most 30%, 25%, 22%, 20%, 18%, 16%, 14%, 12%, 10%, 9%, 8%, 7%, 6% or 5% by weight; including, for example, at least 0.05% or 0.1% or 0.5% or 1%, 2/i %, 3% or 4% by weight, $TiO_2$: less than 2% or 1%/0 or 0.5% by weight;

$Fe_2O_3$: less than 2% or 1% or 0.5% by weight;

As already discussed, the product of the invention makes a highly suitable raw material for the production of a refractory product, in particular a carbon-bonded product. Thus, the invention also pertains to the use of a refractory product in accordance with the invention as a raw material for the production of a refractory product, in particular a carbon-bonded product, in particular a refractory alumina-carbon or magnesia-carbon product.

The refractory product of the invention can thus be used when the product of the invention, in particular in the form of a solidified melt, is comminuted, in particular into a grainy material, and then used as a raw material for the production of a refractory carbon-bonded product.

Further details of the invention will become apparent from the claims as well as the following exemplary embodiment of the invention.

All of the features of the invention may be combined with each other in any manner, either individually or in combination.

In the exemplary embodiment, an example of an embodiment of a batch in accordance with the invention is described in more detail.

Firstly, a batch was provided which had the following components in the following proportions by weight:
Calcined silica: 90% by weight;
Graphite: 5% by weight;
Kaolin: 5% by weight.

The calcined silica, which in the exemplary embodiment constituted the base component based on alumina, was of high purity, with a proportion of $Al_2O_3$ of 99.4% by weight with respect to the weight of the calcined silica. The $d_{90}$ value for the grain size was 95 µm.

In the exemplary embodiment, the carbon component was constituted by graphite. The proportion of carbon was 94.61% with respect to the weight of graphite. The $d_{90}$ value for the grain size was 500 µm.

Finally in the exemplary embodiment, the silicate component, based on aluminium silicate, was kaolin, wherein the total proportion of $Al_2O_3$ and $SiO_2$ was 97.6% by weight with respect to the weight of the kaolin. The $d_{90}$ value for the grain size was 17.6 µm.

The chemical composition of the batch was as follows:
$Al_2O_3$: 91.66% by weight;
C: 4.73% by weight;
$SiO_2$: 2.96% by weight;
Alkali oxides: 0.24% by weight;
$TiO_2$: 0.03% by weight;
$Fe_2O_3$: 0.13% by weight;
Others: 0.25% by weight.

The components of the batch were mixed and melted in a crucible in an electric arc furnace at a temperature of more than 2000° C. for a period of approximately 5 hours.

Next, the melt was allowed to cool and solidify in the crucible in order to produce a refractory product in the form of a solidified melt.

The product comprised the following phases in the following proportions:
Corundum ($Al_2O_3$): 95% by weight;
$Al_4O_4C$: 2% by weight;
SiC+SiCAlON: 1.8% by weight;
Other phases: 1.2% by weight.

The proportion of carbon in the product was 0.78% by weight.

The density of the product was 3.62 g/cm³.

The open porosity of the product was 4.85% by volume.

The density was determined in accordance with British Standard BS 1902-3.16:1990 with a mercury intrusion pressure for the measurements of 0.52 psia. The open porosity was determined in accordance with British Standard BS 1902-3.16:1990 with a mercury intrusion pressure for the measurements of 0.52 psia and 33000 psia. The proportion of carbon in the product was determined in accordance with DIN EN ISO 21068-2:2008-12.

Figure 1:
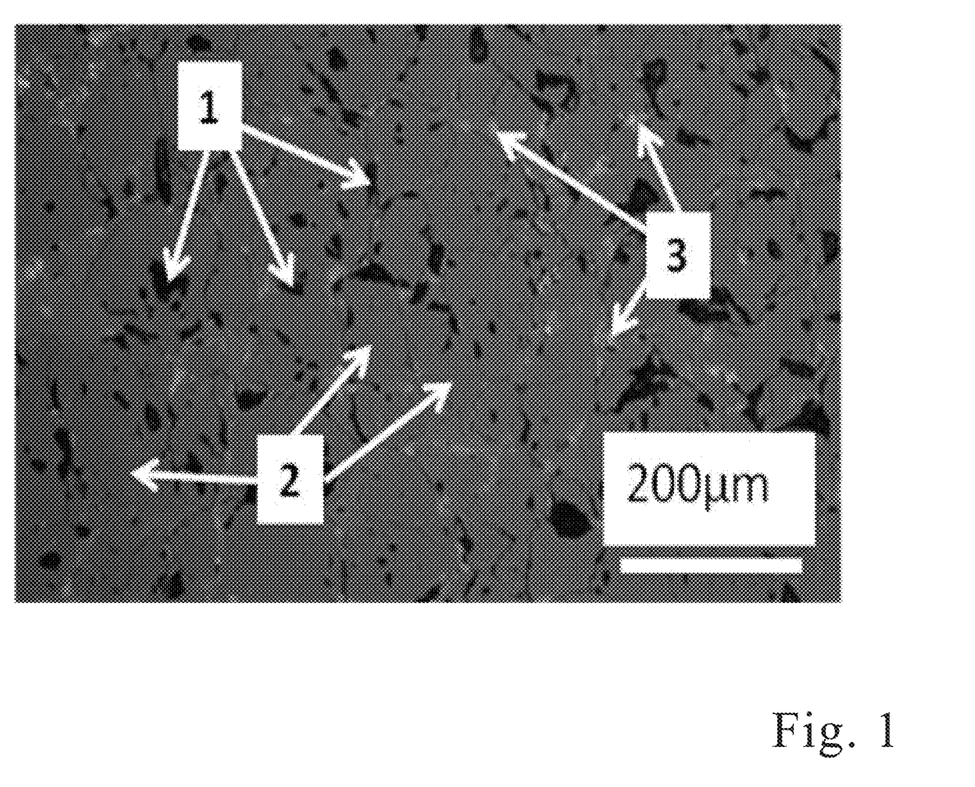
FIGS. 1-3 are enlarged electron microscopic images of samples of a refractory product.
Figure 2:
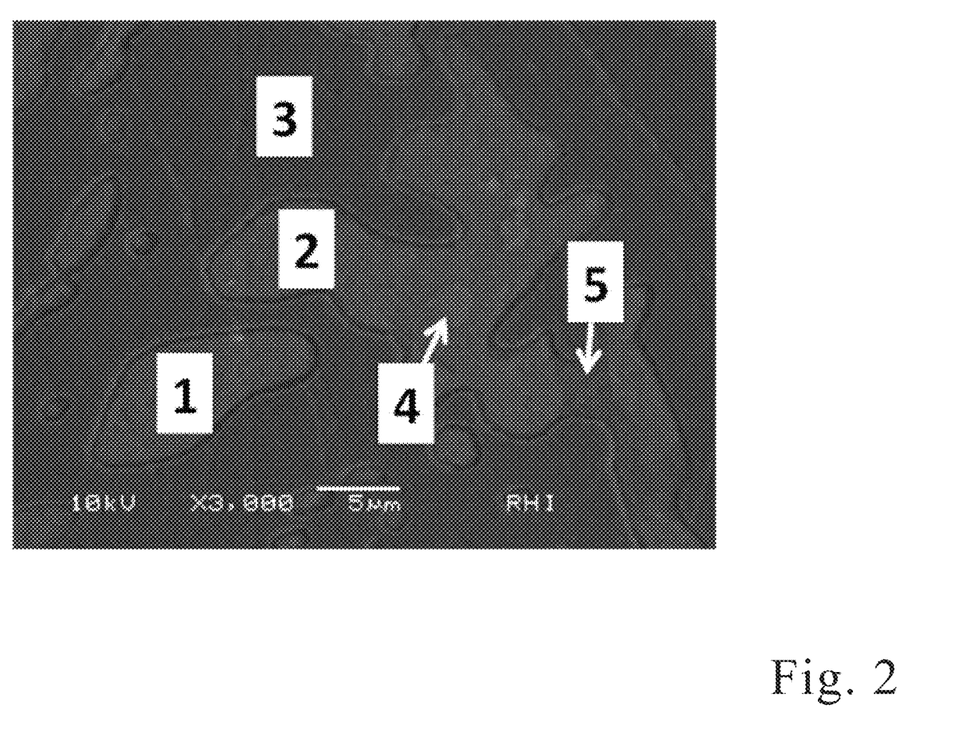
Figure 3:
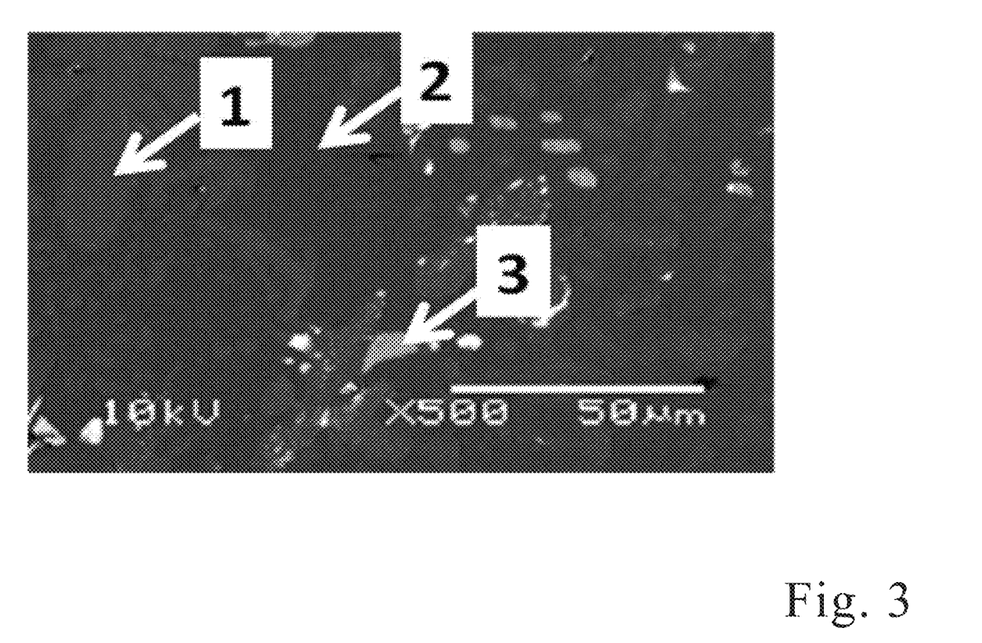

Polished sections were prepared from this product and enlarged electron microscopic images of these samples were produced from these samples, as shown in FIGS. 1 to 3.

In FIG. 1, the white bar in the bottom right hand corner of the image corresponds to a length of 200 µm. The phase with reference numeral 1 corresponds to $Al_2O_3$. Reference numeral 2 indicates the non-oxide phases in the form of SiC, $Al_4O_4C$, SiAlON, SiCAlON and Al oxynitride in particular. The isotropic distribution of the non-oxide phases can clearly be discerned. Finally, reference numeral 3 indicates pores in the microstructure of the product.

In the image of FIG. 2, the white bar in the bottom centre of the image corresponds to a length of 5 µm. Reference numeral 1 indicates the major phase in the form of corundum. The phases indicated with reference numerals 4, 5 and 6 are each non-oxide phases. In this respect, reference numeral 4 indicates a phase in the form of SiXAlON, reference numeral 5 indicates a phase in the form of SiC and reference numeral 6 indicates a mixed non-oxide phase.

In the image of FIG. 3, the white bar in the bottom right hand corner of the image indicates a length of 50 µm. Reference numeral 1 indicates the major phase in the form of corundum, while reference numeral 4 once again indicates a non-oxide phase in the form of SiCAlON and reference numeral 7 indicates a phase in the form of metallic silicon.

What is claimed is:

1. A process for the production of a refractory product, comprising the following steps:
   providing a batch, the batch comprising:
      at least 50% by weight of a base component based on alumina in the form of one or more of the following components: fused corundum, sintered corundum or calcined alumina;
      at least 0.5% by weight of at least one of the following silicate components: at least one silicate component based on aluminium silicate or at least one silicate component based on zirconium silicate; and
      a carbon component;
   melting the batch; and
   cooling the melt, wherein the product, produced by the process, has a density of more than 3.3 g/cm$^3$, an open porosity of less than 8% by volume, and a content of $Al_4C_3$ of at most 2% by weight, and further wherein the product comprises the following phases in the following proportions:
   corundum: 64% to 99.5% by weight; and
   total weight of SiC, $Al_4O_4C$, SiAlON, SiCAlON, Al oxynitride: 0.5% to 36% by weight.

2. The process of claim 1, wherein the batch has a carbon component in the form of graphite.

3. The process of claim 1, wherein the refractory product is used as a raw material for the production of another refractory product.

4. The process of claim 1, wherein the produced refractory product has a proportion of carbon in the product of less than 2.4% by weight.

5. The process of claim 1, wherein the produced refractory product is in the form of a solidified melt.

6. A refractory product produced by a process, the process comprising the following steps:
   providing a batch, the batch comprising:
      at least 50% by weight of a base component based on alumina in the form of one or more of the following components: fused corundum, sintered corundum or calcined alumina;
      at least 0.5% by weight of at least one of the following silicate components: at least one silicate component based on aluminium silicate or at least one silicate component based on zirconium silicate; and
      a carbon component;
   melting the batch; and
   cooling the melt, wherein the product, produced by the process, has a density of more than 3.3 g/cm$^3$, an open porosity of less than 8% by volume, and a content of $Al_4C_3$ of at most 2% by weight, and further wherein the product comprises the following phases in the following proportions:
   corundum: 64% to 99.5% by weight; and
   total weight of SiC, $Al_4O_4C$, SiAlON, SiCAlON, Al oxynitride: 0.5% to 36% by weight.

7. The refractory product as claimed in claim 6, with a proportion of carbon in the product of less than 2.4% by weight.

8. The refractory product as claimed in claim 6, in the form of a solidified melt.

9. The refractory product as claimed in claim 6, wherein the batch has at least one of the following silicate components: kaolin, metakaolin, fireclay, pyrophyllite, mullite, or zircon.

10. The refractory product as claimed in claim 6, wherein the batch has a carbon component in the form of graphite.

11. The refractory product as claimed in claim 6, wherein the refractory product is used as a raw material for the production of another refractory product.

\* \* \* \* \*